Patented Aug. 10, 1948

2,446,547

UNITED STATES PATENT OFFICE 2,446,547

CATALYTIC CONVERSION OF HYDROCARBONS WITH A THORIUM PHOSPHATE CATALYST

George Alexander Mills, Ridley Park, Pa., assignor to Houdry Process Corporation, Wilmington, Del., a corporation of Delaware No Drawing. Application March 1, 1946, Serial No. 651,427

5 Claims. (Cl. 196—52)

The present invention relates to the catalytic conversion of hydrocarbons such as fractions obtained or derived from petroleum or other carbonaceous or hydrocarbonaceous materials. It is chiefly concerned with catalytic conversion employing cracking catalysts. A "cracking catalyst" is understood in the art as one promoting essentially the scission of carbon to carbon linkages in hydrocarbon compounds, although other chemical reactions including condensation may and ordinarily do coincidentally take place.

Among the objects of the present invention are to provide new processes for the catalytic conversion of hydrocarbons employing novel cracking catalysts.

In accordance with a preferred form of the present invention a hydrocarbon material is catalytically treated at elevated temperature under conversion conditions in contact with a thorium phosphate.

A principal application of this invention is in the cracking to gasoline of hydrocarbon materials higher boiling than gasoline. Following such a contacting operation, gasoline is separated from the synthetic crude. The gasoline so separated has been found to be exceptionally stable and to have a high octane value and a high blending value. Other applications of this invention involve the treating of gasoline under cracking conditions resulting in improvement of its stability and in improvement of its octane value; the reforming of naphthas resulting in increased octane value and in many instances in a lowering of the boiling range; and also the cracking of hydrocarbon gases.

The contact masses employed in accordance with the present invention are in general produced by the interaction in aqueous menstruum of a compound of thorium and a phosphate, including in the latter term hydrogen phosphates, commonly known as phosphoric acids. Advantageously the thorium compound employed is a soluble salt such as the chloride or nitrate. Alternatively, an insoluble compound such as the oxide or hydroxide may be employed in dispersed form for reaction with the phosphate. Likewise, soluble phosphates are preferred such as alkali metal or ammonium phosphate as such, or the same may be formed in the reaction mixture employing for instance ortho or meta phosphoric acid and an alkaline reacting salt or base. The thorium phosphate formed, depending upon the specific reactants employed and the concentrations, may be a precipitate or a gel.

The thorium phosphate may be washed free or substantially free of other cations and anions if desired and if preferably dried prior to washing. In accordance with a preferred form of the invention, the thorium phosphate is formed into pellets or other discrete pieces in any known or desired manner and the obtained pieces calcined at elevated temperature at above 500° F. For instance the washed or unwashed product may be filtered and partially dried to form a cake which can be broken up to lumps of suitable size or the same may be cast or extruded to pieces of desired size and shape with adjustment of the water content to proper advantage for the particular forming process employed; that is, the wet product may be reduced in water content or water added to the dried product as required.

Although the contact material is referred to herein as thorium phosphate for convenience, it cannot be definitely asserted that the mass comprises a combination of cation and anion or comprises a plurality of oxides. Apparently even though precipitating reactions to form the product involve stoichiometric ratios, such ratios may not be retained on calcination, in fact there are some indications that dissociation does occur at least in part at these high temperatures. The invention accordingly is not limited to any particular salt structure or composition but includes the products of interaction of the stated types of reagents, yielding products consisting essentially of combinations of thorium, phosphorus and oxygen, which are herein referred to for expedience as thorium phosphate.

It is within the scope of the present invention to employ contact masses in which the thorium phosphate is deposited or precipitated in or on a suitable support or carrier, which may be inactive such as silica gel, fuller's earth or bauxite, or a catalytically active earth or clay such an acid-activated bentonite, or a compound synthetic gel such as silica-alumina.

In the use of the catalysts of the present invention, the usual conditions of cracking can be availed of without modification, the catalyst being in the form of fine particles, granules, globules, pellets or the like. The described catalyst can be employed in fixed bed processes for cracking of petroleum fractions as well as in processes in which the catalyst moves through the reaction zone. As an example of a fixed bed operation, cracking may be carried out at a temperature of 800–900° F., employing a space rate (volume of charge liquid bases per volume of catalyst per hour) of about 1.5 and a pressure of about 15 pounds per square inch gauge. The temperaof course, may be varied within the range of about 700 to 1100° F., the space rate within the range of about 0.5 to 8 and pressures may be employed from about atmospheric or slightly lower up to about 100 pounds per square inch or higher. Under these conditions the operating period "on stream" may range from five to sixty minutes, for example 10 to 30 minutes alternating with regeneration periods. In commercial operation temperatures above 750° F. are preferred. Steam may be added to the charge stock and is particularly advantageous in assisting the vaporization of heavier stocks.

In processes other than the fixed bed, such as where the catalyst moves through the reaction zone, the conditions employed may be such as to subject the oil to substantially equivalent conditions including contact time and ratios of oil to catalyst as those set out above in connection with the fixed bed process.

Reforming may be carried out in accordance with the invention by charging a virgin or cracked gasoline or naphtha fraction under conditions similar to those employed in cracking.

Where as in the fixed bed operation the catalyst is alternately subjected to regeneration, in the other processes the catalyst is passed during its cycle through a separate regeneration zone. In all of these processes regeneration is effected by contacting the catalyst after use, with air or other oxygen-containing gas to burn off carbonaceous deposit.

The catalysts of the present invention also find use in synthesis reactions, for example, polymerization of gaseous hydrocarbons to liquid products.

Example

A thorium phosphate gel having the probable formula $(ThO)_2P_2O_7$ was prepared as follows (proportions are given by weight):

(a) To 164.8 parts of thorium nitrate

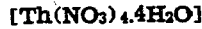
[$Th(NO_3)_4.4H_2O$]

dissolved in 1680 parts of water, there was added 18 parts of aqua ammonia (28%).

(b) To 34.3 parts of mono-ammonium phosphate ($NH_4H_2PO_4$) dissolved in 1680 parts of water, there was added 18 parts of aqua ammonia (28%).

Solution (b) was poured into solution (a) with agitation and an additional 9 parts of 28% aqueous ammonia added. A gel was thereby formed at pH 4.5. The gel was filtered and dried in an oven at 230° F. with air being blown through the mass. The dried gel was washed in water until the wash water tested free of Th, $NO_3$ and $PO_4$. The washed gel was dried, ground in a ball mill and then formed into pellets.

The above prepared pellets were calcined in air at 1050° F. for two hours and employed in the cracking of a light East Texas gas oil under the following operating conditions: 800° F., atmospheric pressure, liquid space rate of 1.5, ten minute on stream periods. There was obtained from the charge stock about 19% by volume of gasoline based on feed.

Obviously many modifications and variations of the invention as hereinbefore set forth may be made without departing from the spirit and scope thereof and therefore only such limitations should be emposed as are indicated in the appended claims.

I claim as my invention:

1. In the catalytic production of valuble hydrocarbon materials, the process which comprises subjecting a hydrocarbon oil under catalytic cracking conditions to contact with a thorium phosphate.

2. In the catalytic production of liquid hydrocarbons in the gasoline boiling range the process which comprises cracking a hydrocarbon material heavier than gasoline by subjecting the material at a temperature above 700° F. to contact with a catalyst resulting from the calcination of the reaction product of a soluble thorium compound and a soluble phosphate.

3. The process which comprises cracking a hydrocarbon material by contacting the material at a temperature between 700–1100° F. and at a liquid space rate of 0.5 to 8 with a calcined reaction product of a thorium compound and a phosphate.

4. In the catalytic production of gasoline from hydrocarbons of average boiling range higher than gasoline, the process which comprises cracking the higher boiling hydrocarbons in the presence of thorium phosphate, and separating from the reaction products a fraction of gasoline boiling range.

5. The process which comprises cracking petroleum hydrocarbons in the presence of a catalyst comprising the reaction product of an ammonium phosphate and a soluble thorium salt, the cracking operation being conducted at a temperature of 800°–900° F. employing a liquid space rate of about 1.5.

GEORGE ALEXANDER MILLS.

REFERENCES CITED

The following references are of record in the file of this patent:

UNITED STATES PATENTS

| Number | Name | Date |
| --- | --- | --- |
| 1,812,398 | Galle et al. | June 30, 1931 |
| 2,270,812 | Melaven et al. | June 20, 1942 |
| 2,378,209 | Fuller et al. | June 12, 1943 |